June 3, 1958 A. G. THOMAS ET AL 2,837,670
MOTORS

Filed Aug. 5, 1954 2 Sheets-Sheet 1

Albert G. Thomas
Thomas D. Johnson
INVENTORS

June 3, 1958  A. G. THOMAS ET AL  2,837,670

MOTORS

Filed Aug. 5, 1954  2 Sheets-Sheet 2

Albert G. Thomas INVENTORS
Thomas D. Johnson

United States Patent Office 2,837,670
Patented June 3, 1958

2,837,670

MOTORS

Albert G. Thomas and Thomas D. Johnson, Chattanooga, Tenn., assignors, by direct and mesne assignments, to Industrial Controls Corporation, Chattanooga, Tenn.

Application August 5, 1954, Serial No. 448,021

18 Claims. (Cl. 310—49)

This invention relates to step motors and to self-synchronous motors and is related to motors and control systems as described in pending applications Serial No. 295,694 filed June 20, 1952, now Patent No. 2,774,922, December 18, 1956, and Serial No. 406,740 filed January 28, 1954, now Patent No. 2,782,354, February 19, 1957.

In numerous commercial applications, as in computers, machine tool controls, synchronized drives, telemetering, handling devices, indexing and transfer operations and the like, it is desirable to use step motors, controlled by a commutator or other current distributor or by a tape or other record. It is also desirable in many cases to employ a two phase step motor, due to relative simplicity, lightness of weight, and power.

It is an object to provide a two phase step motor in which the rotor has minimum inertia.

Another object is to provide a two phase step motor in which the magnetic pull on the rotor is largely radially directed.

A further object is to provide a self-synchronous or selsyn motor or other motor with a brake to prevent oscillations.

Other objects will be evident in the following description when taken in connection with the accompanying drawings, in which.

Figure 1:
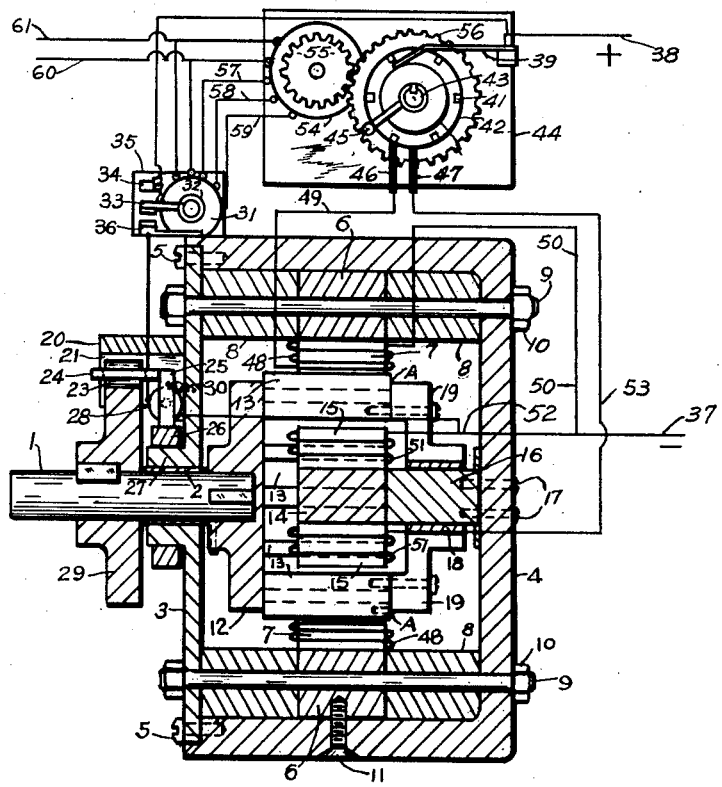
Fig. 1 is a part sectional side elevation of our two phase step motor with a cup-like rotor.
Figure 2:
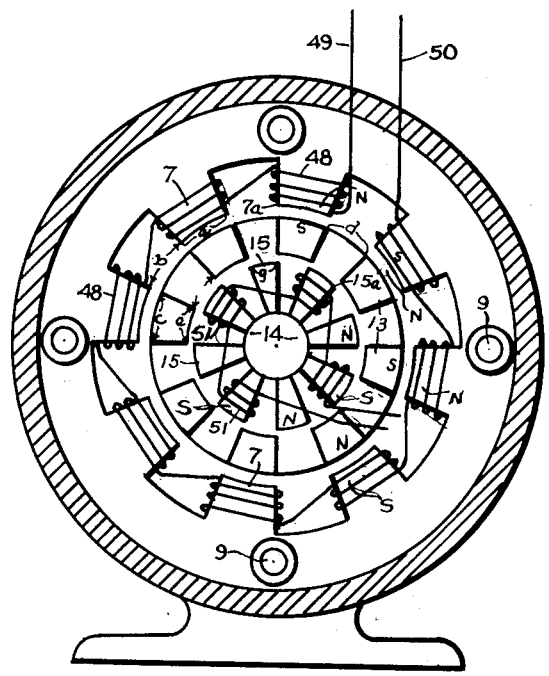
Fig. 2 is a part sectional end view of the motor of Fig. 1, seen in the plane AA, as viewed from the right.

In Fig. 1, motor shaft 1 is rotatable in long bearing 2 in end bell or end plate 3 which is fastened to the recessed edge of cup-like motor housing 4 by means of screws 5. Centrally located stator ring 6, which may be laminated, is made of silicon steel or metal of good magnetic permeability and has equally spaced integral teeth or poles 7 generally directed toward the axis of shaft 1. The circumferential inner width of these poles "a" is preferably substantially equal to the circumferential spacing "b" between the pole tips, as shown in Fig. 2. The axial width of the poles can be any dimension desired, depending upon the power of the motor. Ring 6 has a plurality of axially parallel holes therein and tie rods 9 are passed through these holes and through collar type spacers 8 and through holes in plate 3 and housing 4. The ends of the rods are threaded and nuts 10 are tightened to clamp the assembly together. The stator ring may be keyed to housing 4 to prevent rotation, or screw 11 passing through the housing may fasten the stator in place.

Rotor disc or plate 12 is made of silicon steel or the like and may be laminated or constructed of powdered metal to reduce eddy current and hysteresis losses. Rotor teeth or poles 13 are integral with disc 12 and project therefrom in axial direction. Their peripheral circular width "c" (Fig. 2) is approximately the same as the inner circumferential width "a" of the stator poles 7 and their circular spacing "d" is preferably substantially equal to width "c." The stator and rotor teeth are generally trapezoidal in shape. The inner circular width "e" of the rotor teeth is preferably equal to the inner circular spacing "f" between them.

Inner stator cylinder 14 has generally trapezoidal poles or teeth 15 projecting therefrom and is made of silicon steel or the like. The circular tooth width "g" is approximately equal to the circular spacing between the teeth and is also approximately equal to the circular inner width "e" of the rotor teeth 13. Cylinder 14 is screwed or otherwise attached to brass or other non-magnetic stub shaft 16 and may be electrically insulated therefrom. Stub shaft 16 is attached to housing 4 by means of screws 17. Bearing 18 is integral with arms 19 which are screwed to rotor unit 12 or to teeth 13 and is rotatable on cylinder 16. This bearing and arms are made of bronze, aluminum or other non-magnetic material and may be electrically insulated from rotor teeth 13. These arms are not essential, but will tend to make the rotor run true.

Figure 3:
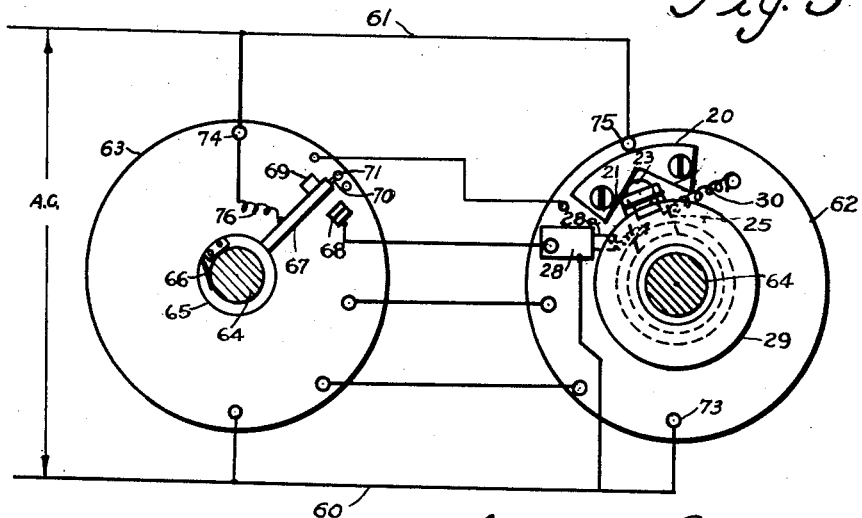
Fig. 3 is an end view of a selsyn motor system showing a transmitter, and connected receiver with brake.

Inverted V type cam 20, of hardened steel, is bolted or otherwise fastened to disc or plate 3. This cam is of the general shape shown in Fig. 3 and has inclined oppositely sloped surfaces 21 and 22 against which hardened roller 23 may be moved by cage 24 attached to arm 25 which is integral with or attached to collar 26 which is rotatable through a small angle about hub or boss 27 extending from plate 3. The plunger of the solenoid 28 is attached to arm 25 by means of a stiff spring, so that the roller 23 will be pulled over into contact with cam surface 21 when the solenoid is energized, cage 24 allowing free radial play of the roller. The roller is supported on the hardened steel disc 29 which is keyed to motor shaft 1. Tension spring 30 is attached to arm 25 and to plate 3 and normally pulls the arm over to hold roller 23 in contact with cam surface 22 (Fig. 3). When roller 23 is pinched between cam surface 21 and disc 29, disc 29 and rotor 12 may be rotated in clockwise direction as seen from the left of Fig. 1, but is locked against rotation in the opposite direction. When roller 23 is pinched between the other cam surface and disc 29, counterclockwise rotation of the disc and rotor is permitted, but not rotation in clockwise direction.

Small selsyn motor 31 is fastened to the frame or casing of the step motor, and collar 32 carrying contact arm 33 is fastened to the shaft of motor 31. If the shaft of motor 31 rotates through a small angle in clockwise direction, arm 33 is brought against stop 34 which is attached to plate 35 fastened to the motor. Contact 36, fastened to plate 35, is connected to one terminal of solenoid 28, the other terminal of which is connected to negative line 37 leading from a generator or other source of direct current. Positive line 38, from the current source, is connected with brush 39 which is in contact with slip ring 40 electrically connected with a plurality of uniformly spaced commutator bars 41 inserted in the periphery of plastic or other insulating disc 42. Slip ring 40 is attached to disc 42 concentrically therewith. Disc 42 is keyed to shaft 43 which is rotatable in a suitable bearing in plate 44. Handle 45 is attached to shaft 43 which may likewise be rotated by a motor, or otherwise.

Brush 46 is in contact with the periphery of disc 42 and is connected by means of conductor 49 with a terminal of stator pole windings 48 which may be connected in series or otherwise, to magnetize alternate stator poles 7 with opposite polarity. It is preferable that there be an even number of poles. The other terminal of stator windings 48 is connected to negative line 37 by means of conductor 50. Similarly, inner stator poles 15 are shown with alternate poles having magnetizing windings 51 which may be connected in series and in such manner that alternate poles are of opposite polarity as indicated. Each pole can be wound, however. One terminal of windings 51 is connected to negative line 37 by conductor 52 and the other terminal of windings 51 is connected to brush 47 by conductor 53. Brushes 46 and 47 are spaced preferably about one half the peripheral spacing of contacts or bars 41.

Small selsyn transmitter 54, similar to selsyn receiver 31, is fastened to plate 44 and its shaft is rotated by attached gear 55 which is meshed with gear 56 fastened to shaft 43. The three phase windings of the transmitter and receiver are connected by conductors 57, 58 and 59 and the primaries are connected to alternating current lines 60—61.

In operation, if handle 45 is turned, in say clockwise direction, contacts 41 will be rotated first under brush 47 and then under brush 46, repeatedly directing current first through windings 51 and then through windings 48. When windings 51 are energized, overlapping rotor teeth 13 are magnetically snapped into register or alignment with stator teeth 15, but, due to momentum of the rotor, the teeth 13 continue beyond the aligned position until the back magnetic pull or back pull and friction bring the rotor to rest. When this occurs and disc 29 and attached rotor start reverse swing, roller 23, in conjunction with cam 20, locks disc 29 so that it is stopped in a position in which rotor teeth 13 project beyond the forward edges 15a of stator teeth 15 and beyond the trailing edges 7a of stator teeth 7. When windings 48 are then energized, causing poles or teeth 7 to be magnetized, the overlapping rotor teeth 13 are magnetically pulled into alignment and beyond so that rotor teeth 13 will overlap stator teeth 15 again, the disc 29 and rotor being locked by roller 23 against backswing for each step movement of the rotor. It is assumed that arm 33 has been held against stop 34 during this time as a result of torque developed in receiver 31 when the rotor of transmitter 54 is rotated by gear 55. Under these conditions spring 30 pulls arm 25 over so that roller 23 is wedged against cam surface 22 (Fig. 3), allowing clockwise rotation of rotor teeth 13 as seen in Fig. 2, but disc 29 is locked against opposite rotation.

Now if shaft 43 is rotated in opposite direction, arm 33 will be urged against contact 36 and solenoid 28 attached to the motor will be energized, bringing roller 23 into contact with cam surface 21, so that the rotor may be rotated in counter clockwise direction, as seen in Fig. 2, but not in opposite direction. The roller 23 will be shifted from cam surface 22 to cam surface 21 quickly so that the brake will be operative for reversed direction of rotation of the disc and rotor. Reversal is accomplished by repeating the energization of either phase since this will result in starting the rotor in the reverse direction, due to pole overlap. Special reversing mechanism may be used, however, to give the rotor a boost in reverse direction.

A commutator or distributor is shown for switching current to the stator windings alternately, but electronic tubes such as thyratrons may be used for this purpose and the thyratron firing may be controlled by a tape or other record.

This two phase motor has advantages of simplicity of construction, and the rotor may be made light so that it can be accelerated and decelerated rapidly. Weight reducing holes or the like can be put in the rotor and the rotor hub or central portion can be made of light weight aluminum or magnesium.

Figure 4:
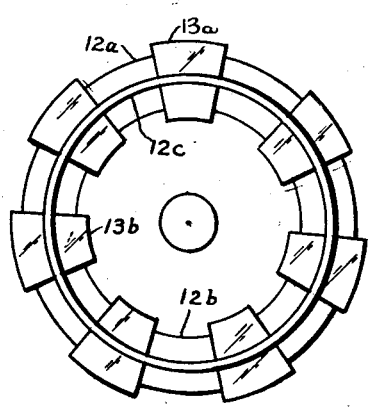
Fig. 4 is a face view of a modified rotor having inner and outer poles or teeth, magnetically isolated.

The rotor can be made as shown in Fig. 4. The magnetizable rotor teeth 13a, adapted to cooperate with stator teeth or poles 7, project in axial direction from magnetizable ring 12a, the teeth preferably projecting beyond the ring outward in radial direction. These teeth, or the ring, or both, are fastened to non-magnetic ring 12c which may be made of brass or aluminum or the like or it may comprise non-conductive material like Bakelite. Inner magnetizable rotor teeth 13b project in axial direction from magnetizable ring 12b which may be attached to the inner surface of ring 12c or teeth 13b may be attached to ring 12c. In this way the magnetic fields of each group of stator poles are independently associated with the rotor so that there is little danger of cross-over of magnetic flux from one stator to the other through the rotor teeth.

In Fig. 3, self-synchronous receiver motor 62 has attached cam 20, disc 29, spring 30, arm 25, cage 24, roller 23 and solenoid 28 arranged as described in connection with the motor of Fig. 1. Selsyn transmitter motor 63 has shaft 64 around which floating collar 65 is placed, friction between collar and shaft being provided by spring 66 attached to the collar and pressing against the shaft. Contact arm 67 is fastened to collar 65 which may be of insulating material if desired. Contact 68 is fastened to motor 63 and is insulated therefrom. Contact arm 67 is adapted to strike contact 68 or stop 69 fastened to the motor, depending upon the direction of rotation of motor shaft 64. Flexible strip 70 carrying ball 71 is fastened to arm 67 and the ball falls into one of two dimples in the motor casing to hold arm 67 against contact 68 or against stop 69. Contact 68 is electrically connected with one terminal of solenoid 28 attached to motor 62 and the other terminal of the solenoid is connected with alternating current line 60 which is also connected to the primary terminals 72 and 73 of respective selsyns 63 and 62. The associated alternating current line 61 is connected with the other primary terminal 74 of motor 63 and with the other primary terminal 75 of motor 62. Line 61 is also connected to contact arm 67 by means of flexible conductor 76.

In operation, the connections are such that clockwise rotation of shaft 64 of transmitter 63 will produce clockwise rotation of shaft 64a of receiver 62. Under these conditions arm 67 is rotated into contact with contact element 68 and current is passed through the winding of solenoid 28 resulting in plunger 28a of the solenoid pulling roller 23 over into contact with cam surface 21. Clockwise rotation of disc 29 and shaft 64a is then possible, but the roller locks the disc and shaft against counter-clockwise rotation. This tends to eliminate hunting which has heretofore been a problem in selsyn or similar systems. If shaft 64 is turned in counter-clockwise direction, arm 67 strikes stop 69 and spring 30 pulls roller 23 over against cam surface 22, allowing counter-clockwise rotation of disc 29, but not clockwise rotation. The brake therefore improves the stability of the motor system, for either direction of rotation. The slipping connection between ring 65 and shaft 64 allows the latter to rotate even though the movement of arm 67 is limited. It is obvious that small motors or other electrically responsive devices can be used in place of arm 67 in order to energize the solenoid when the transmitter is rotated in a chosen direction.

The shaft 64 may be turned manually or by a meter, by a moving part of an instrument or machine, or in any way in which self synchronous motors may be used. The braking system may also be applied to other synchronous, shunt wound, series wound, induction, or direct current or alternating current motors of any kind, in order to reduce hunting and to improve stability.

What we claim is:

1. In a step motor, rotor means having a plurality of substantially evenly spaced poles, first stator means having a plurality of substantially evenly spaced poles surrounding said rotor poles and cooperating therewith, second stator means having a plurality of substantially evenly spaced poles surrounded by said rotor poles and cooperating therewith, winding means for said first and second stator means, means for supplying current to said first and second stator means alternately, and brake means continuously in effect for holding said rotor means against rotation in one direction of more than a fraction of one step, the poles of said stator means being positionally phased so that rotor poles will be positioned intermediate the poles of one stator means when rotor poles are in alignment with the poles of the other stator means.

2. In a two phase step motor, a rotor having a plurality of substantially equally spaced poles flaring to greater circumferential width with increasing radius, a first stator having a plurality of poles surrounding said rotor poles, the inner circumferential widths of said stator poles being substantially equal to the outer circumferential widths of said rotor poles and spaced correspondingly, a second stator having a plurality of substantially equally spaced poles surrounded by said rotor poles, the outer circumferential widths of said second stator poles being substantially equal to the inner circumferential widths of said rotor poles, said second stator poles being positioned so that they substantially bridge the gaps between the rotor poles when said rotor poles are in register with said first stator poles, means for magnetizing said first stator poles, and means for magnetizing said second stator poles.

3. The motor as described in claim 2, said magnetizing means including means for magnetizing said stator poles intermittently.

4. The motor as described in claim 2, said first stator pole magnetizing means including first winding means, said second stator pole magnetizing means including second winding means, and current distribution means for distributing current to said first and second winding means alternately.

5. The motor as described in claim 2, and including over-running clutch means for locking said rotor against any greater than a partial step rotation in one direction while allowing substantially unimpeded rotation in opposite direction, said over-running clutch means being continuously effective for any position of said rotor.

6. The motor as described in claim 2, and including continuously effective means for locking said rotor against any appreciable rotation in one direction while allowing substantially free rotation in opposite direction, said locking means being effective for any position of said rotor.

7. The motor as described in claim 2 and including a circular element carried by said rotor, a cam attached to said motor, a rollable element adapted to be pressed against said circular element and said cam to lock said rotor against rotation in one direction while allowing rotation thereof in opposite direction, and means including resilient means for pressing said rollable element against said circular element and said cam.

8. In a two phase step motor, rotor means having a plurality of substantially equally spaced poles, first stator means having a plurality of substantially equally spaced poles surrounding said rotor poles which are adapted to be brought into register therewith, second stator means having a plurality of substantially equally spaced poles surrounded by said rotor poles which are adapted to be brought into register with said second stator poles, said rotor poles and said first and second stator poles being relatively positionally phased so that when rotor poles are in register with poles of one said stator means rotor poles are substantially intermediate poles of the other said stator means, means for causing magnetization of poles of said first stator means, and means for causing magnetization of poles of said second stator means.

9. The motor as described in claim 8, the rotor poles associated with said first stator means being magnetically separated from the rotor poles associated with said second stator means.

10. The motor as described in claim 8, the rotor poles associated with said first stator means being electrically insulated from the rotor poles associated with said second stator means.

11. The motor as described in claim 8, said means for causing magnetization including means for causing magnetization of said first and second stator means alternately.

12. The motor as described in claim 8, said means for causing magnetization including first winding means for said first stator means and second winding means for said second stator means, and means for distributing current alternately to said first and second winding means.

13. The motor as described in claim 8, and including one-way locking means for preventing any appreciable rotation of said rotor in one direction while allowing rotation thereof in opposite direction, said locking means being continuously effective during rotation of said rotor in said one direction.

14. The motor as described in claim 8, and including one-way locking means for preventing any appreciable rotation of said rotor in one direction while allowing rotation thereof in opposite direction, said locking means being continuously effective during rotation of said rotor in said one direction, and including means for reversing the effective direction of said locking means.

15. In a two phase step motor, a rotor having a plurality of substantially equally spaced poles flaring to greater circumferential width with increasing radius, a first stator having poles equal in number to the number of rotor poles and surrounding said rotor poles and similarly spaced, winding means for energizing the poles of said first stator which poles project radially inward toward the axis of the rotor, a second stator having the same number of poles as said first stator and projecting radially outward from the rotor axis and being surrounded by said rotor, the radial axes of the poles of said second stator being situated approximately midway between the radial axes of the poles of said first stator, and other winding means for energizing said second stator.

16. The device as described in claim 15, and an insulating band splitting said flaring rotor poles into inner and outer rotor poles with respect to said band.

17. The device as described in claim 15, and including means continuously in effect for locking said rotor to prevent movement thereof greater than a partial step in one direction while allowing substantially free movement thereof in opposite direction.

18. The device as described in claim 15, and including means continuously in effect for locking said rotor to prevent movement thereof greater than a partial step in one direction while allowing substantially free movement thereof in opposite direction, and means for reversing the effective direction of said locking means.

References Cited in the file of this patent

UNITED STATES PATENTS

| | | |
|---|---|---|
| 843,287 | MacCoy | Feb. 5, 1907 |
| 1,301,050 | Hagman | Apr. 15, 1919 |
| 1,977,745 | Thompson | Oct. 23, 1934 |
| 2,124,672 | Pershing | July 26, 1938 |
| 2,343,325 | Ranseen | Mar. 7, 1944 |
| 2,428,327 | Fuge | Sept. 30, 1947 |
| 2,449,020 | Spraragen | Sept. 7, 1948 |
| 2,515,944 | Bennett | July 18, 1950 |
| 2,528,181 | Sacchini | Oct. 31, 1950 |
| 2,627,040 | Hansen | Jan. 27, 1953 |